(12) United States Patent
Yu et al.

(10) Patent No.: US 9,760,942 B2
(45) Date of Patent: Sep. 12, 2017

(54) DISPLAY APPARATUS FOR SUPPORTING SEARCH SERVICE, USER TERMINAL FOR PERFORMING SEARCH OF OBJECT, AND METHODS THEREOF

(75) Inventors: Seung-dong Yu, Gyeonggi-do (KR);
Woo-Yong Chang, Gyeonggi-do (KR);
Se-jun Park, Gyeonggi-do (KR);
Min-jeong Moon, Gyeonggi-do (KR);
Soo-hong Park, Gyeonggi-do (KR);
Jin-guk Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 12/917,931

(22) Filed: Nov. 2, 2010

(65) Prior Publication Data
US 2011/0106657 A1    May 5, 2011

(30) Foreign Application Priority Data
Nov. 2, 2009 (KR) .................. 10-2009-0105020

(51) Int. Cl.
*G06Q 30/06* (2012.01)
*G06F 17/30* (2006.01)
*H04N 21/258* (2011.01)

(52) U.S. Cl.
CPC ..... *G06Q 30/0639* (2013.01); *G06F 17/3087* (2013.01); *H04N 21/25841* (2013.01)

(58) Field of Classification Search
CPC ........... G06Q 30/0601; G06Q 30/0639; G06F 17/3087; H04N 21/25841
USPC ............................................... 705/26.1, 26.9
See application file for complete search history.

(56) References Cited

U.S. PATENT DOCUMENTS

| | | | |
|---|---|---|---|
| 6,954,735 B1 * | 10/2005 | Djupsjobacka et al. ..... 705/26.8 |
| 7,537,156 B2 * | 5/2009 | Singer-Harter ............... 235/383 |
| 7,779,028 B1 * | 8/2010 | Kenderov ..................... 707/769 |
| 8,073,460 B1 * | 12/2011 | Scofield et al. ........... 455/456.1 |
| 8,181,212 B2 * | 5/2012 | Sigal ................ G06F 17/30855 705/14.55 |
| 8,312,486 B1 * | 11/2012 | Briggs ................. H04N 21/435 725/32 |
| 8,392,262 B2 * | 3/2013 | Mallick et al. .............. 705/26.1 |
| 2003/0212996 A1 * | 11/2003 | Wolzien ......................... 725/60 |

(Continued)

FOREIGN PATENT DOCUMENTS

| | | |
|---|---|---|
| CN | 101632097 | 1/2010 |
| EP | 1 271 354 | 1/2003 |

(Continued)

OTHER PUBLICATIONS

Chinese Office Action dated Nov. 25, 2014 issued in counterpart application No. 201080049131.9.

(Continued)

*Primary Examiner* — Yogesh C Garg
(74) *Attorney, Agent, or Firm* — The Farrell Law Firm, P.C.

(57) ABSTRACT

A method for providing a search service of a display apparatus includes receiving a selection of an object by displaying a screen that displays at least one object, and providing location information adaptive to the user terminal to the user terminal using all location information of the searched object and information regarding a user location. Accordingly, a user may conveniently search a desired object.

21 Claims, 8 Drawing Sheets

(56) References Cited

U.S. PATENT DOCUMENTS

| | | | |
|---|---|---|---|
| 2005/0174327 A1* | 8/2005 | Lee | G08C 17/00 345/158 |
| 2006/0020523 A1 | 1/2006 | Song | |
| 2006/0195878 A1* | 8/2006 | Pack et al. | 725/113 |
| 2007/0010942 A1 | 1/2007 | Bill | |
| 2007/0257792 A1 | 11/2007 | Gold | |
| 2008/0005055 A1 | 1/2008 | Horvitz | |
| 2008/0017708 A1* | 1/2008 | Singer-Harter | 235/383 |
| 2008/0162300 A1* | 7/2008 | Ewald | 705/26 |
| 2008/0228568 A1 | 9/2008 | Williams et al. | |
| 2009/0187489 A1* | 7/2009 | Mallick et al. | 705/26 |
| 2010/0131367 A1* | 5/2010 | Sun | 705/14.58 |
| 2010/0162303 A1* | 6/2010 | Cassanova | H04N 5/44591 725/37 |
| 2010/0218228 A1* | 8/2010 | Walter | G06F 17/30259 725/105 |
| 2011/0067064 A1* | 3/2011 | Karaoguz | G06F 3/0304 725/40 |

FOREIGN PATENT DOCUMENTS

| | | |
|---|---|---|
| JP | 2006-139458 | 6/2006 |
| KR | 1020080078217 | 8/2008 |
| KR | 1020090106148 | 10/2009 |

OTHER PUBLICATIONS

Chinese Office Action dated Apr. 28, 2015 issued in counterpart application No. 201080049131.9.
Chinese Office Action dated Nov. 2, 2015 issued in counterpart application No. 201080049131.9, 16 pages.
Korean Office Action dated Sep. 11, 2015 issued in counterpart application No. 10-2009-0105020, 14 pages.
Korean Office Action dated Mar. 24, 2016 issued in counterpart application No. 10-2009-0105020, 14 pages.
Chinese Office Action dated Apr. 25, 2016 issued in counterpart application No. 201080049131.9, 13 pages.
Chinese Office Action dated Sep. 28, 2016 issued in counterpart application No. 201080049131.9, 26 pages.

* cited by examiner

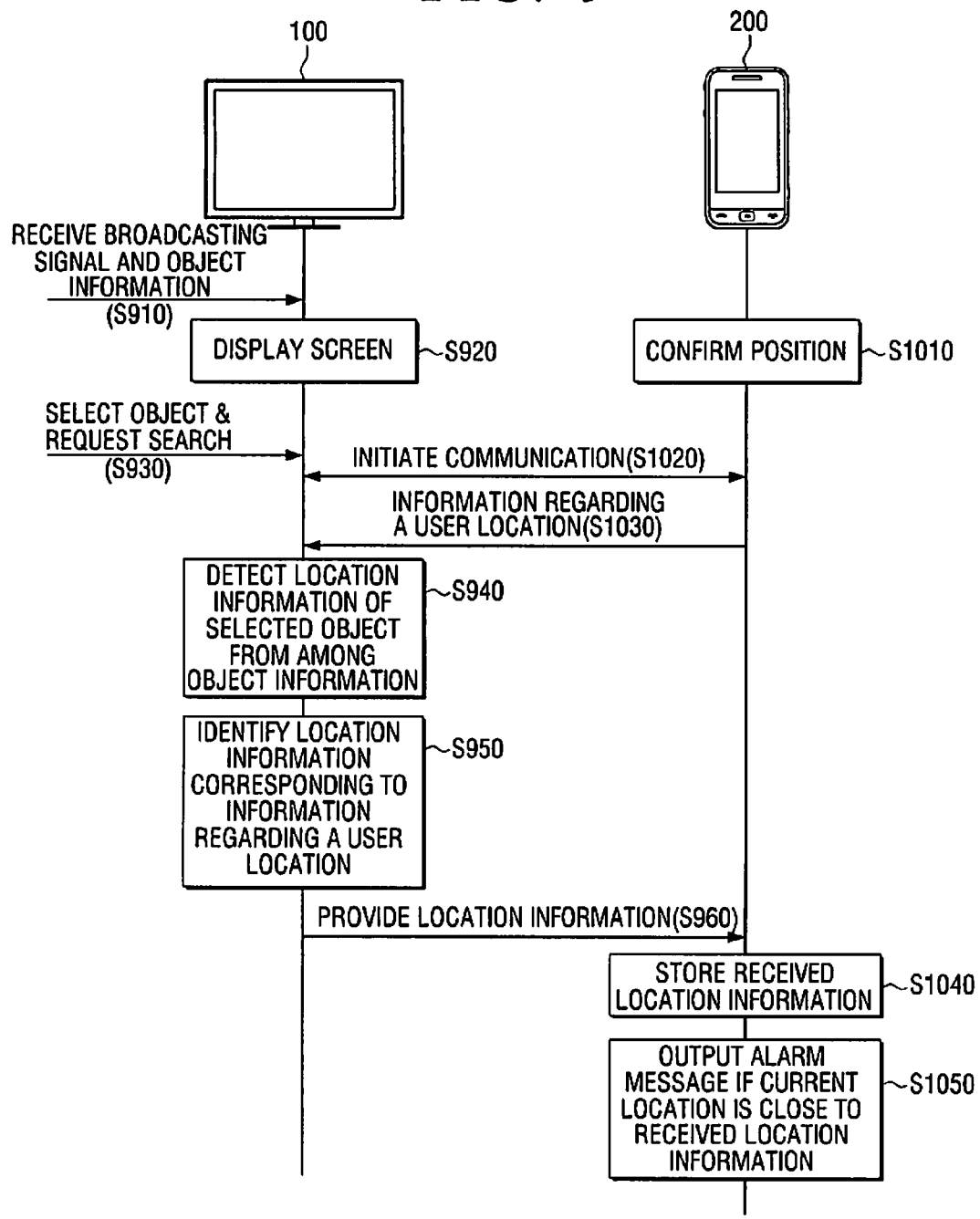

DISPLAY APPARATUS FOR SUPPORTING SEARCH SERVICE, USER TERMINAL FOR PERFORMING SEARCH OF OBJECT, AND METHODS THEREOF

PRIORITY

This application claims priority under 35 U.S.C. §119 to Korean Patent Application No. 2009-0105020, which was filed in the Korean Intellectual Property Office on Nov. 2, 2009, the contents of which are incorporated herein by reference.

BACKGROUND OF THE INVENTION

1. Field of the Invention

The present invention relates generally to a display apparatus, a user terminal, and operation methods thereof, and more particularly, to a display apparatus which provides a service for searching an object using the location of a user terminal, a user terminal, and methods thereof.

2. Description of the Related Art

Electronic devices having various functions have proliferated as electronic technology has advanced. Particular improvements have been realized with the performance of display apparatuses such as televisions.

A user may watch various types of images on the screen of a display apparatus. In particular, as cable broadcasting and a digital broadcasting service have recently been provided, on which a user may watch various channels.

If a user desires information about a product or a place appearing on the screen, he or she has to search for information through the Internet, or ask someone who knows about the product or the place, both of which are inconvenient.

Accordingly, there is a need for a service that allows a user to search information regarding an object on a display apparatus, that is, a product or a place appearing on the screen of a display apparatus more easily and precisely.

SUMMARY OF THE INVENTION

Embodiments of the present invention relate to a display apparatus which allows a user to search information regarding a desired object more conveniently, by combining information regarding the location of a user terminal that the user has with information regarding the location of an object selected by the user, a user terminal, and methods thereof.

According to the present invention, a method for providing a search service in a display apparatus includes receiving a selection of an object by displaying a screen which includes at least one object, and providing, to the user terminal, location information adaptive to the user terminal, using all location information of the searched object and information regarding a user location. A display apparatus according to the present invention includes a receiving unit for receiving information regarding a broadcasting signal and objects including the broadcasting signal on a screen, a display unit for displaying a screen according to the broadcasting signal, an interface unit for receiving, if at least one object is selected on the screen, a request for searching the selected object, a storage unit for storing the object information and the information regarding a user location, and a controller for detecting, if the search request is received, all location information of the searched object from among object information stored in the storage unit, generating location information adaptive to the user terminal using the detected all location information and the stored the information regarding a user location, and providing the location information adaptive to the user terminal through the interface unit.

According to the present invention, a method for providing a search service of a user terminal includes receiving, from the display apparatus, location information adaptive to the user terminal from among all location information of a selected object on a screen of a display apparatus, and outputting an alarm message if the user terminal moves to be within a distance with respect to the received location information.

According to the present invention, a user terminal includes a communication unit for receiving, from the display apparatus, location information adaptive to the user terminal from among all location information of a selected object on a screen of a display apparatus, a storage unit for storing the received location information, an output unit for outputting a message, and a controller for outputting an alarm message through the output unit if the user terminal moves to be within a distance from the received location information.

According to the present invention, a method for searching an object using a display apparatus includes selecting an object to be searched and inputting a search request on a screen of a display apparatus, transmitting information regarding a moving path of a user terminal to the display apparatus, transmitting location information corresponding to a moving path of the user terminal from among all location information regarding the searched object from the display apparatus to the user terminal, and outputting an alarm message, if the user terminal moves to be within a distance with respect to the location information.

BRIEF DESCRIPTION OF THE DRAWINGS

The above and/or other aspects of the present invention will be more apparent by describing the present invention with reference to the accompanying drawings, in which:

FIG. 9 illustrates a method for search an objection in a system according to an embodiment of the present invention.

DETAILED DESCRIPTION OF EMBODIMENTS OF THE INVENTION

Figure 1:
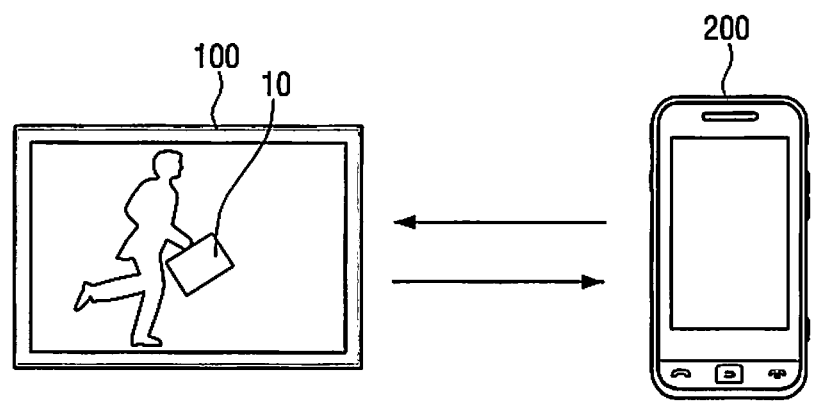
FIG. 1 illustrates a search system according to an embodiment of the present invention.

Embodiments of the present invention will now be described in greater detail with reference to the accompanying drawings. In the following description, the same drawing reference numerals are used to refer to the same elements, even in different drawings. The matters defined in the following description, such as detailed construction and element descriptions, are provided as examples to assist in a comprehensive understanding of the invention. Also, well-known functions or constructions are not described in detail for the sake of clarity and conciseness.

FIG. 1 illustrates a method for searching an object according to an embodiment of the present invention. Referring to FIG. 1, a system for searching an object comprises a display apparatus 100 and a user terminal 200.

The display apparatus 100 may usually be embodied as a television, but is not limited thereto. That is, the display apparatus 100 may be various types of apparatus with a display function including a digital photo frame, a Personal Computer (PC), a notebook PC, and a Personal Data Assistant (PDA). The user terminal 200 may also be various types of portable apparatus such as a mobile phone, a PDA, a Motion Pictures Experts Group (MPEG) Layer Audio 3(MP3) player, and a navigator.

A user may watch a broadcast program through a screen of the display apparatus 100, and may select an object displayed on the screen, such as a product or a place. The object may be selected via a remote controller of the display apparatus 100 or directly through the user terminal 200.

If the user selects the object, the display apparatus 100 communicates with the user terminal 200 and receives information regarding a location of the user terminal 200.

The information regarding a location may be information regarding a current location of the user terminal 200 or information regarding moving path of the user terminal 200. Herein, the current location information may be an absolute coordinate value such as a specific longitude and latitude, or a text indicating a name of an administrative district or a lot number where the user terminal 200 is used.

The moving path may be an actual path in which the user terminal 200 moves or a main path that the user terminal 200 passes more than a number of times or for a time unit. That is, the moving path may be a path that the user terminal 200 passes in a recent day or week. Such path information may be calculated by accumulating the above-mentioned coordinate value. For example, if the user terminal 200 moves from (x, y) to (x+10, y−10), the change in coordinate value between the two coordinates may be accumulated and stored, and then provided to the display apparatus 100. Accordingly, the display apparatus 100 may precisely determine the moving path. If the information regarding a location is a text, all changes in location may be provided as texts, or changes in relative compass direction and distance with respect to at least one reference location may be provided to the display apparatus 100 so that the display apparatus 100 may determine the moving path.

In addition, the information regarding a location may be provided to the display apparatus 100 in the form of a map representing information in which surroundings of a current location or a moving path of the user terminal 200 are graphics-processed in a map and displayed, or the display apparatus 100 may convert the information into a map.

The display apparatus 100 generates information regarding a location, which is adaptive to the user terminal 200 using information regarding a location, provided by the user terminal 200 and location information of an object in the display apparatus 100. The location information adaptive to the user terminal 200 represents information regarding a location that is adjacent to a current location or a moving path of the user terminal 200, or a location that is approachable to the user terminal 200.

The user terminal 200 stores the provided location information, and may output an alarm message to inform a user if the user approaches the location.

Figure 2:
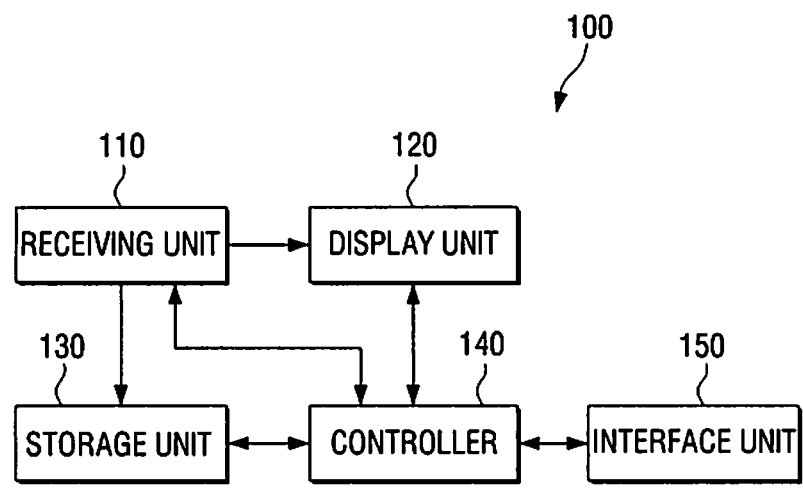
FIG. 2 is illustrates a display apparatus according to an embodiment of the present invention.

FIG. 2 illustrates the display apparatus 100 for providing the above-described search service.

Referring to FIG. 2, the display apparatus 100 comprises a receiving unit 110, a display unit 120, a storage unit 130, a controller 140, and an interface unit 150.

The receiving unit 110 represents an element such as an antenna and a tuner, which receives a broadcasting signal. The receiving unit 110 may include various elements such as a demodulator and an equalizer. The receiving unit 110 may receive not only a broadcasting signal but also information regarding objections that constitute the screen of the broadcasting signal. Such information regarding objects may be metadata extracted from product information that is included in a stream of the broadcasting signal and provided from a broadcasting station. Alternatively, the information regarding objects may be transmitted from a source that is separate from the broadcasting signal, such as a web server or a shopping mall server of a company that supports producing of a broadcasting program.

The display unit 120 processes a broadcasting signal received from the receiving unit 110 and displays the processed broadcasting signal on a screen. The display unit 120 may include various elements such as a de-multiplexer, an image decoder, an audio decoder, an amplifier, and a display panel. Since functions and configurations of the receiving unit 110 and the display unit are already known, detailed explanation and illustration will not be provided for purposes of conciseness.

The object information received from the receiving unit 110 is stored in the storage unit 130. In FIG. 2, the object information is provided directly from the receiving unit 110 to the storage unit 130, but this is only an example. The object information may be decoded in a decoder formed in the display unit 120 and stored in the storage unit 130.

The interface unit 150 is connected to the user terminal 200 and receives information regarding a location.

The controller 140 controls overall operation of each element of the display apparatus 100.

Specifically, the controller 140 controls the display unit 120 to process and display a broadcasting signal received through the receiving unit 110. In this case, if an object is selected through a remote controller or the user terminal 200, and a request for searching the selected object is input, the controller 140 reads out location information from among object information corresponding to the selected object from the storage unit 130.

The object information may include not only location information but also other types of information. That is, if the object is a product, the object information may include name, price, manufacturer, sales shop, and description of the product. The information regarding the sales shop may be the location information. The storage unit 130 may store information regarding sales shop in all regions. If the object is a place such as a restaurant, a park or a hotel, the object information may include name, address, contact information, and related enterprises such as a chain store, entrance fee, menu, price, and menu price. The information regarding the address and related enterprise may be used as the location information.

The controller 140 receives information regarding a user location as described above, from the interface unit 150. Specifically, the information regarding a user location may be information regarding a current location or a moving path of the user terminal 200, or a location of a display apparatus.

The controller 140 identifies location information corresponding to the information regarding a user location, from among information detected from the storage unit 130. If an object is a product, for example, only information regarding a sales shop which is the nearest and the most approachable from the current location or the moving path of the user terminal 200, may be detected from among sales shops in all regions selling the corresponding product. Herein, the most approachable sales shop may be determined considering traffic facilities. Approachability may be determined by applying an algorithm for searching an optimum path, which is the same algorithm used for a navigation system.

The controller 140 provides the user terminal 200 with the identified location information through the interface unit 150. The user terminal 200 may provide a user with the provided location information in various manners.

For example, the user terminal 200 may monitor whether its location is close to the received location information. If it is determined that the user terminal 200 is close to the received location information, an alarm message may be output to inform a user of the fact that the user terminal 200 is close to the received location information. The alarm message may be output in various forms, such as on the screen of the user terminal 200 as an image message or through a speaker as an audio message.

In another embodiment, the user terminal 200 may display the received location information on a map, and execute a navigation program showing a moving path to the received location information, using map information and current location information. The above operation may be executed as soon as the location information is received, or the location information may be stored and the above operation is executed only when a user inputs a command to identify corresponding location information.

In another embodiment, the display apparatus 100 may not provide the user terminal 200 with location information. Instead, the display apparatus 100 may determine whether the user terminal 200 approaches a corresponding location, and if it is determined that the user terminal 200 approaches the corresponding location, the display apparatus 100 may provide the user terminal 200 with an alarm message. That is, the controller 140 of the display apparatus 100 may continuously monitor the location of the user terminal 200 by periodically communicating with and receiving current location information from the user terminal 200. Accordingly, if it is determined that the user terminal 200 approaches searched location information, the controller 140 may notify that to the user terminal 200, in such manners as a Short Message Service (SMS), a Long Message Service (LMS), an e-mail, and a multi-mail service.

Figure 3:
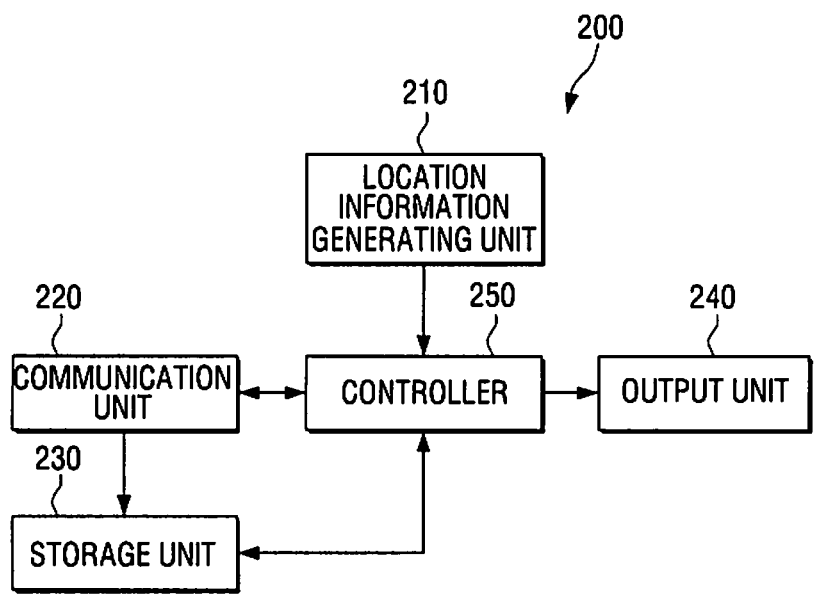
FIG. 3 illustrates a user terminal according to an embodiment of the present invention.

FIG. 3 illustrates the user terminal 200 according to an embodiment of the present invention. Referring to FIG. 3, the user terminal 200 comprises a location information generating unit 210, a communication unit 220, a storage unit 230, an output unit 240, and a controller 250.

The location information generating unit 210 generates information regarding a user location, that is, information regarding the location or the moving path of the user terminal 200. Although it is not illustrated in FIG. 3, the location information generating unit 210 may include a Global Positioning System (GPS) module (not shown) which receives a GPS signal.

The GPS module receives a signal transmitted from a plurality of GPS satellites and calculates a distance between a satellite and a receiver using the time difference between a transmission time and a reception time. The current location of the user terminal 200 may be calculated using an operation such as trilateration by considering a calculated distance among each of the plurality of satellites and the location of the satellites.

The location information calculated by the GPS module may be stored in the storage unit 230 or an external storage unit (not shown). If the information regarding a user location is path information, the storage unit 230 may accumulatively identify the moving path of the user terminal 200 using the location information which is stored in the storage unit 230.

The communication unit 220 is connected to the display apparatus 100 and transmits/receives various data or commands. Specifically, the communication unit 220 transmits information regarding a user location, generated by the location information generating unit 210, to the display apparatus 100. If the display apparatus 100 transmits location information adaptive to the user terminal 200, the communication unit 220 notifies the controller 250 of receiving of the location information.

The controller 250 controls the storage unit 230 to store the received location information. In this case, the controller 250 continuously identifies the current location of the user terminal 200 detected by the location information generating unit 210, and determines whether the identified location is within the location information stored in the storage unit 230 and a predetermined distance. If it is determined that the current location of the user terminal 200 is within a predetermined distance based on the stored location information, the controller 250 controls the output unit 240 to output an alarm message.

The alarm message may be a simple image message with a text, an audio message, or a map screen. If the alarm message is provided in a map screen, the output unit 240 displays a map including the location information on a screen. If a navigation function is available, the controller 250 may operate the navigation function so that a user may move to the corresponding location information.

As described above, if the display apparatus 100 continuously monitors change in the location of the user terminal 200 and provides an alarm message accordingly, the location information may not be stored in the storage unit 230 in FIG. 3. The controller 250 therefore periodically transmits the current location information identified by the location information generating unit 210 to the display apparatus. If an alarm message or a command to output the alarm message is transmitted from the display apparatus 100, the controller 250 outputs the alarm message through the output unit 240.

Figure 4:
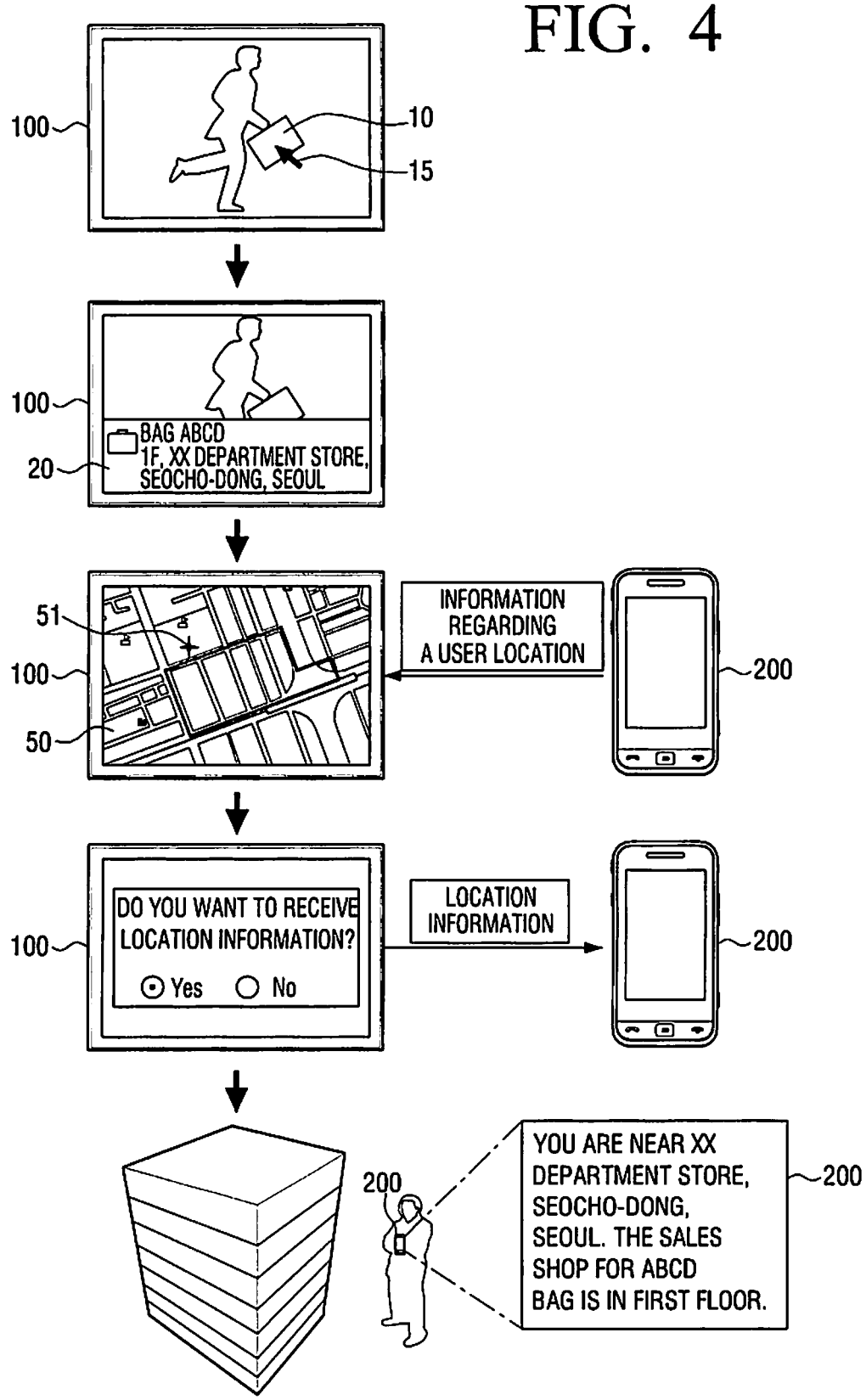
FIG. 4 illustrates a method for providing a search service according to an embodiment of the present invention.

FIG. 4 illustrates an operation of a system according to an embodiment of the present invention. Referring to FIG. 4, an object 10 on the screen of the display apparatus 100 is selected. A user may select the object 10 using a remote controller, the user terminal 200 or other input means. In this case, a cursor 15 may be displayed on the screen to select the object 10. To more easily select the object 10, a user may select the object while the screen of the display apparatus 100 is paused. In this case, as a command to pause a screen is input, a selectable object may be displayed on the screen. If a background is selected on the screen, a place of the background of the screen may be selected as an object.

If an object is selected, information 20 regarding the object is displayed on one portion of the screen of the display apparatus 100. In FIG. 4, the information 20 displays information regarding the name of the object 10 and a shop where a user can buy the object 10 on the screen. In this case, the display apparatus 100 receives information regarding a user location from the user terminal 200.

The display apparatus 100 provides the user terminal 200 with only location information corresponding to the information regarding a user location, from among all of the location information of the selected object. The display apparatus 100 may display information regarding a user location and the location information on the screen. If the information regarding a user location is provided in the form of a map 50 of FIG. 4, the display apparatus 100 may display the location information by mapping the location information 51 of an object on the map 50. In FIG. 4, the information regarding a user location is map information, but this is only an example. The information regarding a user location may be displayed in a text, such as "a location which is 100 m apart from AAA crossroads in BB direction".

Prior to providing the user terminal 200 with location information, the display apparatus 100 may confirm a user's intention. That is, as illustrated in FIG. 4, a message window for inquiring whether to receive location information may be displayed first, and if a user agrees to receive the location information in the message window, the display apparatus 100 may transmit the location information to the user terminal 200.

In this case, information regarding the user terminal 200 may be pre-registered in the display apparatus 100. That is, a user may store a telephone number or an Internet protocol (IP) address of the user terminal 200 which receives location information in the display apparatus 100 in advance so that the user terminal 200 may directly retrieve the location information as the user simply inputs a command.

Alternatively, an area for inputting information regarding the user terminal 200 may be formed in a message window for inquiring whether to receive the location information as illustrated in FIG. 4 so that a user may input the user terminal 200 to receive the location information each time. Accordingly, the location information may be transmitted to a user terminal of a third party instead of the user terminal of a user who watches the display apparatus 100.

As described above, if the location information is transmitted to the user terminal 200, which stores the received information. If the user moves and approaches the location information, the user terminal 200 may output an alarm message as illustrated by the broken lines in FIG. 4, such as by a text message, an audio message, or a map.

In FIG. 4, the location information is provided with respect to the moving path of the user terminal 200, but this is only an example. The location information may be provided with respect to the current location of the user terminal 200.

Figure 5:
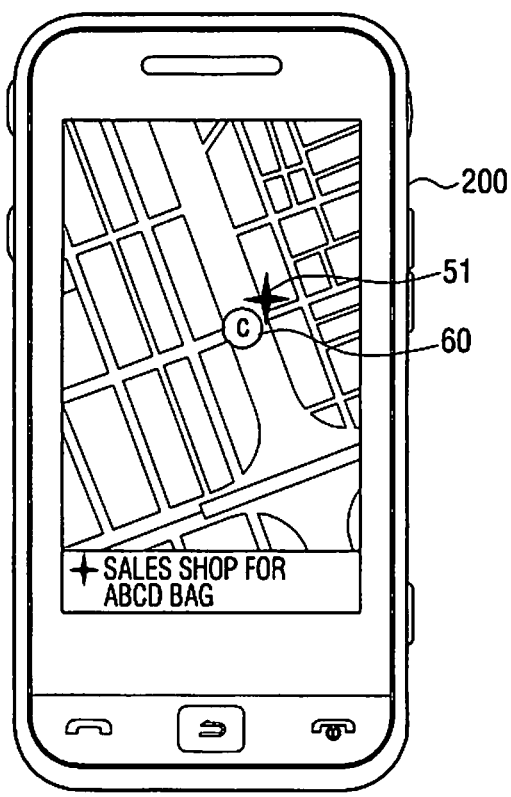
FIGS. 5 and 6 illustrates various examples of screen configurations for displaying location information in a user terminal.

FIG. 5 illustrates an example of screen configurations for displaying location information in a user terminal.

The searched location information 51 on the map and the current location 60 may be displayed on the screen of the user terminal 200, and brief description of the displayed location information 51 may be displayed together.

Figure 6:
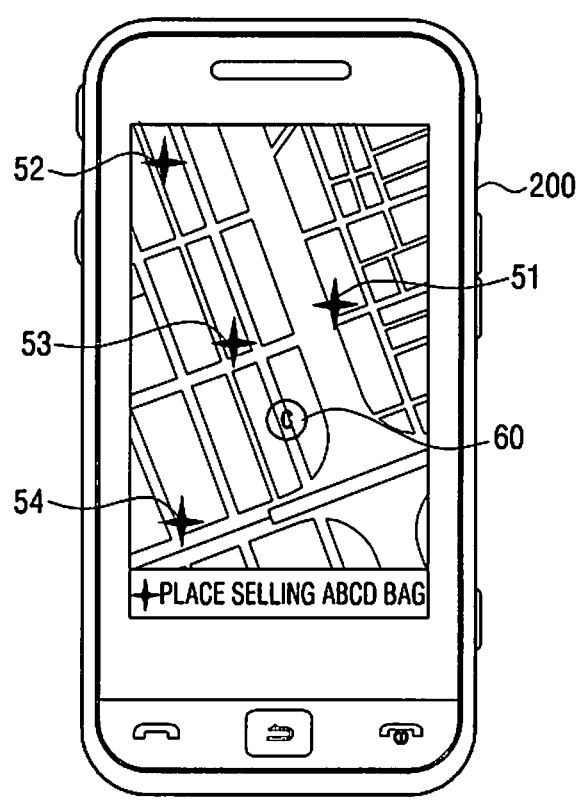

FIG. 6 illustrates an example of the screen of the user terminal 200 when there is a plurality of location information. Referring to FIG. 6, all of the plurality of location information 51-54 and the current location 60 are displayed on the map. If location information corresponding to the information regarding a user location is searched based on a certain district unit (such as a block or city sector) or a certain distance unit (such as radius 5 km or 10 km), a plurality of location information may be searched as illustrated in FIG. 6.

If there is a plurality of location information, all of the searched location information may be provided to the user terminal 200 as illustrated in FIG. 6, or only the location information selected by a user may be provided to the user terminal 200. That is, a list of the plurality of location information may be displayed on the screen of the display apparatus 100 along with a message window for the user's selection. The user may select desired location information in the message window using a remote controller or the user terminal 200.

Figure 7:
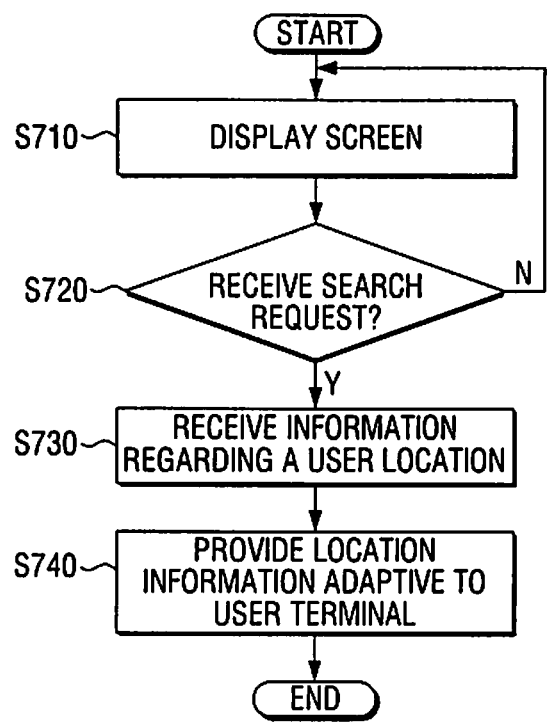
FIG. 7 illustrates a method for providing a search service of a display apparatus according to an embodiment of the present invention.

FIG. 7 illustrates a method for providing a search service of a display apparatus according to an embodiment of the present invention.

Referring to FIG. 7, the display apparatus 100 displays a screen (S710), which may be a broadcasting screen which processes a broadcasting signal transmitted from a broadcasting station, or a screen reproduced from a recoding medium reproducing apparatus such as a Video Cassette Recorder (VCR) and a Digital Video Disc (DVD) player.

If a user inputs a search request (S720), information regarding a user location is received from the user terminal 200 according to the input search request (S730). The connection with the user terminal 200 may be performed using a pre-registered apparatus information (for example, a telephone number or an IP address) or apparatus information newly input by the user, according to a communication protocol. Detailed description and illustration of the communication connection between the user terminal 200 and the display apparatus 100 is well known and will be omitted for the sake of conciseness.

The display apparatus 100 searches location information corresponding to the received information regarding a user location, from among information regarding the selected object, prepares location information adaptive to the user terminal 200, and provides the location information to the user terminal 200 (S740). As the user terminal 200 approaches the provided location information, an alarm message or a command to output an alarm message may be output so that a user may recognizes that the ser terminal 200 approaches the provided location information.

Figure 8:
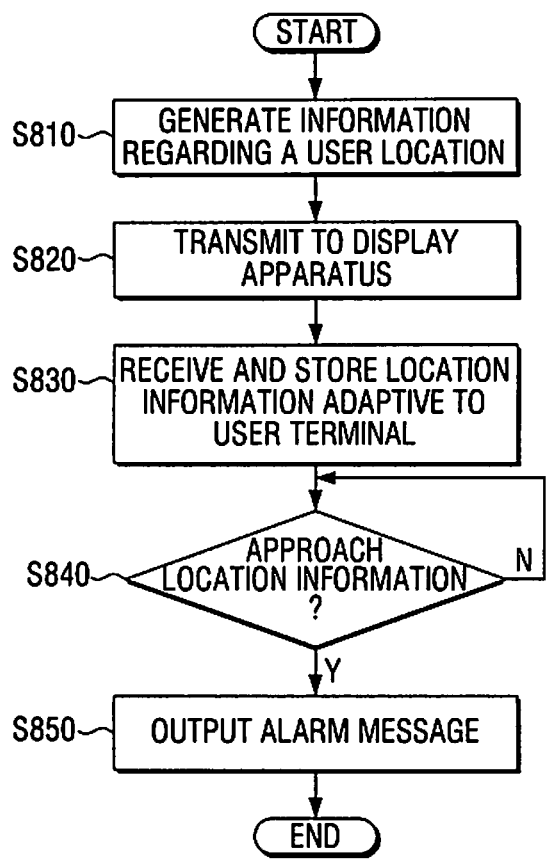
FIG. 8 illustrates a method for providing a search service of a user terminal according to an embodiment of the present invention.

FIG. 8 illustrates a method for searching an object of the user terminal 200 according to an embodiment of the present invention. Referring to FIG. 8, the user terminal 200 generates information regarding a user location (S810), and transmits the generated information regarding a user location to the display apparatus (S820). The information regarding a user location may be generated using a GPS signal. The information regarding a user location is not limited to current location information, and may be information generated using a moving path for a time period or more than a set number of times.

If the display apparatus prepares and transmits location information adaptive to the user terminal 200, the user terminal 200 receives and stores the location information (S830).

The user terminal 200 identifies whether the location of the user terminal frequently approaches the stored location information (S840). If it is determined that the user terminal 200 approaches the location information, the user terminal outputs an alarm message (S850), which may be provided in various forms as described above.

FIG. 9 is a timing chart illustrating a method for search an objection in a system according to an embodiment of the present invention.

As described in FIG. 9, the display apparatus receives a broadcasting signal and object information (S910) and displays the broadcasting signal and object information on a screen (S920).

The user terminal 200 identifies the location periodically using a GPS signal (S1010).

If an object is selected and a search request is input (S930), the user terminal 200 initiates communication (S1020). The communication between the display apparatus and the user terminal 200 may be performed using wireless communication method such as Bluetooth, wireless Local Area Network (LAN) standards, and Radio Frequency Identification (RFID).

Authentication may be performed when communication with the user terminal 200 is initiated. In particular, if the user terminal 200 is an apparatus that can be used by more than two persons, such as a navigator and a notebook PC, it is desirable to perform user authentication to use a user's moving path, such as by inputting an ID and password pre-registered by the user.

The user terminal 200 transmits the information regarding a user location (S1030), generated based on the identified location to the display apparatus 100.

The information regarding a user location may be transmitted to the display apparatus 100 using various methods.

For example, the display apparatus 100 may set its address as a source address and the address of the user terminal 200 as a target address, generate a request message, and transmit the message to the user terminal 200. The user terminal 200 may transmit a response message including the information regarding a user location in response to the received request message.

Alternatively, the user terminal 200 may transmit its information regarding a user location to the display apparatus 100 at set times. To do so, the IP address or an identification number of the display apparatus 100 may be registered in the user terminal 200.

The display apparatus 100 may display location information on its own screen separately from providing location information to the user terminal 200. In this case, a screen on which location information is mapped may be displayed. Accordingly, a user may identify the most convenient path to approach an object simply by watching the screen of the display apparatus 100.

The display apparatus 100 may provide not only location information but also other information regarding an object, such as a name, photo, price, menu, and other distinctive features of the object to the user terminal 200 (S940).

The location information may be frequently displayed before the user terminal 200 approaches the identified location information, corresponding to information regarding a user location (S950). For example, location information or object information may be displayed if the user terminal 200 is turned on or turned off, or a set time or anniversary arrives, to remind a user of the location information or the object information.

In addition, if an object that has been previously searched is displayed again on the screen or a search request for the object is input again, the display apparatus 100 may display a message for informing that the object has already been searched so as to prevent the object from being searched repeatedly.

If a request for searching an object is input, the display apparatus 100 may transmit location information regarding all the corresponding objects to the user terminal 200 (S960). The user terminal 200 may detect only location information corresponding to the current location or the moving path of the user terminal 200 from among the received entire location information. Accordingly, only detected location information may be stored (S1040), and when the user terminal approaches the location information, an alarm message may be output (S1050), the detected location information may be displayed for a user, or a path to the detected location information may be provided.

The display apparatus 100 may transmit the location information to the user terminal 200 in various manners. Specifically, the display apparatus 100 may transmit mapping information of the corresponding location information, text information indicating the corresponding location information, or metadata of a searched object.

Although the foregoing embodiments describe an object service being provided only by operation between the display apparatus 100 and the user terminal 200, other apparatuses may be involved.

For example, the display apparatus 100 may not directly transmit location information of an object that is adaptive to the user terminal 200 to the user terminal 200. Instead, the display apparatus 100 may transmit the location information to a third apparatus, which may be a broadcast transmitter (not shown) which provides a broadcasting signal, a server of an operator who has information regarding an object, or a server of a mobile communication operator to which the user terminal 200 belongs.

If the third apparatus is the server of a mobile communication operator, the server may store location information of an object searched by the user terminal 200 and give notification to the user terminal 200 by sending a text message when the user terminal 200 passes nearby (S960). Such notification may be one of services provided by the mobile communication operator. The location information may be a coordinate value such as a longitude and latitude, or address information based on administrative districts.

Alternatively, if the third apparatus is a server of an operator who sells an object, the display apparatus 100 may transmit information regarding a user who attempts to search the object, for example, the information regarding a user location or telephone number of the user, to the server of the operator. The server of the operator may directly transmit the location information of the object corresponding to the information regarding a user location to the user terminal, or may transmit the location information only when certain conditions are met, such as when a set time arrives, when there is a user request, or when a user approaches the location information.

In the above embodiments, information regarding a user location represents a current location or a moving path of a user terminal, but the user location information is not limited thereto. For example, location information of a display apparatus may be used as the user location information.

That is, since a user typically carries a user terminal and watches a display apparatus at the time of selecting an object, a current location of the display apparatus may be used as information regarding a user location.

In this case, the process and configuration of generating information regarding a user location by a user terminal and transmitting the generated user location information to a display apparatus may be omitted. The display apparatus may generate location information adaptive to the user terminal using its location information stored in a storage unit. As such, information regarding a user location may represent not only information regarding a user's location, but also information regarding a location of the user terminal, that is, terminal location information.

Selection of an object or a search request may be input not only through a user terminal but also through other controlling apparatuses such as a main body of a display apparatus or a remote controller.

Although certain embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A method for providing a search service in a display apparatus, the method, comprising:
    receiving, by a receiving unit, a broadcasting signal from a broadcasting station;
    receiving, by the receiving unit, information regarding at least one object, included in the broadcasting signal, to be displayed;
    displaying, by a display unit, a content of the broadcasting signal on a screen of the display apparatus, the content including the at least one object;
    receiving, by an interface unit, a user command to select an object from among the at least one object in the displayed content;
    receiving, by the receiving unit, location information of a user terminal from the user terminal;
    comparing, by a controller, a plurality of location information included in information of the selected object with the location information received from the user terminal;
    acquiring, by the controller, location information, regarding a point within a predetermined threshold distance from the user terminal, from among the plurality of location information;
    transmitting, by the controller, in response to acquisition of the plurality of location information, where the plurality of location information is within the predetermined threshold distance, list information regarding the acquired location information, to the user terminal; and
    transmitting, by the controller, in response to receiving a user command from the user terminal, location information corresponding to the user command from among the plurality of location information.

2. The method as claimed in claim 1, wherein the location information of the user terminal is information regarding a current location of the display apparatus.

3. The method as claimed in claim 1, wherein acquiring the location information regarding the point within the predetermined threshold distance includes acquiring location information of a point nearest to a current location of the user terminal from among all location information of a plurality of points where the selected object exists.

4. The method as claimed in claim 1, wherein acquiring the location information regarding the point within the predetermined threshold distance includes acquiring location information on a moving route of the user terminal.

5. The method as claimed in claim 4, wherein the information on the moving route of the user terminal includes at least one of information regarding a moving route used by the user terminal for a predetermined time period and information regarding a moving route used by the user terminal for more than a predetermined number of times.

6. The method as claimed in claim 4, wherein the at least one object on the screen includes a purchasable product,
    wherein acquiring the location information regarding the point within the predetermined threshold distance includes acquiring information regarding at least one sales shop within a predetermined distance from the moving route of the user terminal from among all sales shops selling the selected object.

7. The method as claimed in claim 6, wherein acquiring the location information regarding the point within the predetermined threshold distance includes acquiring map information including information regarding a sales shop within a predetermined distance from the moving route of the user terminal from among all the sales shops selling the selected object mapped on a location on a map corresponding to a real-world location of the sales shop.

8. The method as claimed in claim 1, wherein the at least one object on the screen includes a background place displayed on the screen.

9. The method as claimed in claim 1, further comprising:
    displaying the location information adaptive to the user terminal,
    wherein transmitting the location information to the user terminal includes transmitting the location information adaptive to the user terminal, if a selection signal for receiving the display location information is input.

10. The method as claimed in claim 1, further comprising:
    detecting, if a request for searching the selected object is received, location information related to the plurality of location information included in the information of the selected object.

11. The method as claimed in claim 1, wherein the content includes a content corresponding to the broadcasting signal.

12. A display apparatus, comprising:
    a receiving unit for receiving a broadcasting signal from a broadcasting station and receiving information regarding at least one object, included in the broadcasting signal, to be displayed;
    a display unit for displaying, on a screen of the display apparatus, a content of the broadcasting signal, the including the at least one object;
    an interface unit for:
        receiving a user command to select an object from among the at least one object in the displayed content, and
        receiving location information of a user terminal; and
    controller for:
        comparing a plurality of location information included in information of the selected object with the location information received from the user terminal;
        acquiring location information regarding a point within a predetermined threshold distance from the user terminal, from among the plurality of location information,
        controlling transmission, in response to acquiring the plurality of location information, where the plurality of location information is within the predetermined threshold distance, of list information regarding, the acquired location information, to the user terminal, and
        controlling transmission, in response to receiving a user command from the user terminal, of location information corresponding to the user command from among the plurality of location information.

13. The display apparatus as claimed in claim 12, wherein the location information of the user terminal is information regarding a current location of the display apparatus.

14. The display apparatus as claimed in claim 12,
    wherein the controller controls transmission, to the user terminal, of location information of a point nearest to a current location of the user terminal from among all location information of a plurality of points where the selected object exists.

15. The display apparatus as claimed in claim 12, wherein the controller controls transmission, to the user terminal, of location information on a moving route of the user terminal.

16. The display apparatus as claimed in claim 15, wherein the information on the moving route of the user terminal includes at least one of information regarding a moving route used by the user terminal for a predetermined time period and information regarding a moving route used by the user terminal for more than a predetermined number of times.

17. The display apparatus as claimed in claim 15, wherein the at least one object on the screen includes a purchasable product,
  wherein the controller controls transmission, to the user terminal, of information regarding at least one sales shop within a predetermined distance from the moving route of the user terminal from among all sales shops selling the selected object.

18. The display apparatus as claimed in claim 17, wherein the transmitted location information regarding the point within the predetermined threshold distance includes map information including information regarding a sales shop within a predetermined distance from the moving route of the user terminal from among all the sales shops of the selected object mapped on a location on a map corresponding to a real-world location of the sales shop.

19. The display apparatus as claimed in claim 12, wherein the at least one object on the screen includes a background place displayed on the screen.

20. The display apparatus as claimed in claim 12, wherein the display unit displays the location information adaptive to the user terminal on the screen.

21. The display apparatus as claimed in claim 12, wherein the content includes a content corresponding to the broadcasting signal.

\* \* \* \* \*